(12) United States Patent
Donovan et al.

(10) Patent No.: US 6,593,923 B1
(45) Date of Patent: Jul. 15, 2003

(54) SYSTEM, METHOD AND ARTICLE OF MANUFACTURE FOR SHADOW MAPPING

(75) Inventors: Walter E. Donovan, Milpitas, CA (US); Liang Peng, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 201 days.

(21) Appl. No.: 09/640,505

(22) Filed: Aug. 16, 2000

Related U.S. Application Data

(63) Continuation-in-part of application No. 09/585,809, filed on May 31, 2000.

(51) Int. Cl.$^7$ .............................................. G06T 15/00
(52) U.S. Cl. ...................................................... 345/422
(58) Field of Search ................................ 345/419, 420, 345/421, 422, 611, 612, 619

(56) References Cited

U.S. PATENT DOCUMENTS

| | | | | |
|---|---|---|---|---|
| 5,025,407 A | | 6/1991 | Gulley et al. ............... | 364/754 |
| 5,222,202 A | | 6/1993 | Koyamada .................. | 395/123 |
| 5,579,456 A | * | 11/1996 | Cosman ....................... | 345/419 |
| 5,694,143 A | | 12/1997 | Fielder et al. .............. | 345/112 |
| 5,798,762 A | | 8/1998 | Sfarti et al. ................. | 345/420 |
| 5,798,770 A | | 8/1998 | Baldwin ..................... | 345/506 |
| 5,801,711 A | | 9/1998 | Koss et al. .................. | 345/441 |
| 5,838,337 A | | 11/1998 | Kimura et al. .............. | 345/519 |
| 5,856,829 A | * | 1/1999 | Gray et al. .................. | 345/422 |
| 5,966,532 A | | 10/1999 | McDonald et al. ......... | 395/701 |
| 5,977,997 A | | 11/1999 | Vainsencher ................ | 345/519 |
| 6,000,027 A | | 12/1999 | Pawate et al. ................ | 712/39 |
| 6,016,151 A | * | 1/2000 | Lin ............................. | 345/582 |
| 6,046,747 A | | 4/2000 | Saunders et al. ........... | 345/430 |
| 6,532,013 B1 | * | 3/2003 | Papakipos et al. .......... | 345/426 |

FOREIGN PATENT DOCUMENTS

| | | |
|---|---|---|
| EP | 0690430 A2 | 1/1996 |
| EP | 0690430 A3 | 7/1996 |
| WO | WO 98/28695 | 7/1998 |
| WO | WO 99/52040 | 10/1999 |

OTHER PUBLICATIONS

Watt, Advanced Animation and Rendering Techniques Theory and Practice, 1992, New York, New York.
Catmull, Computer Graphics A Quarterly Reoport of SIGGRAPH–ACM, 1978, Atlanta, Ga.
Reeves, Rendering Antialiased Shadows with Depth Maps, 1987, San Rafel, Ca.
Blinn, Texture and Reflection in Computer Generated Images, 1976, University of Utah.
Woo, Open GL Programming Guide Second Edition, Reading, Massachusetts, 1998.
Olano, Triangle Scan Conversion Using 2D Homogeneous Coordinates, 1997, University of North Carolina.
Segal, The OpenGL Graphics System: A Specification, 1999, Mountain View, Ca.
Segal, Fast Shadows and Lighting Effects Using Texture Mapping, 1992, Mountain View, Ca.
Neider, OpenGL Programming Guide, 2001, Reading, Massachusetts.
Andrew Woo, Graphics Gems III, 1992, Pasadena, California.
Lance Williams, Computer Graphics A Quarterly Report of SIGGRAPH–ACM, Aug. 23–25, 1978, Atlanta, Georgia.

* cited by examiner

*Primary Examiner*—Phu K. Nguyen
(74) *Attorney, Agent, or Firm*—Silicon Valley IP Group; Kevin J. Zika

(57) ABSTRACT

A system, method and article of manufacture are provided for shadow mapping while rendering a primitive in a graphics pipeline. Initially, an offset operation is performed in order to generate a depth value while rendering a primitive. Further, a value of a slope associated with an edge of the primitive is identified. Thereafter, the depth value is conditionally clamped based on the value of the slope.

18 Claims, 13 Drawing Sheets

SYSTEM, METHOD AND ARTICLE OF MANUFACTURE FOR SHADOW MAPPING

This application is a continuation-in-part application of a application entitled "SYSTEM, METHOD AND ARTICLE OF MANUFACTURE FOR PIXEL SHADERS FOR PROGRAMMALE SHADING" filed May 31, 2000 under Ser. No. 09/585,809 which is incorporated herein by reference in its entirety. This application is also related to a application entitled "GRAPHICS PIPELINE INCLUDING COMBINER STAGES" filed Mar. 22, 1999 under Ser. No. 09/273,975, issued under U.S. Pat. No. : 6,333,744, and naming David B. Kirk, Matthew Papakipos, Shaun Ho, Walter Donovan, and Curtis Priem as inventors, and which is incorporated herein by reference in its entirety.

FIELD OF THE INVENTION

The present invention relates to computer graphics, and more particularly to shadow mapping in a graphics pipeline.

BACKGROUND OF THE INVENTION

A major objective in graphics rendering is to produce images that are so realistic that the observer believes the image is real. A fundamental difficulty in achieving total visual realism is the complexity of accurately representing real world visual effects. A scene can include a wide variety of textures, subtle color gradations, reflections, translucency, etc. One important way to make images more realistic is to determine how objects in a scene cast shadows and then represent these shadows in the rendered image. Shadows enhance the realism of an image because they give a two-dimensional image a three-dimensional feel.

The addition of shadows to the rendering of a complex model can greatly enhance the understanding of that model's geometry. The human visual system uses shadows as a cue for depth and shape. Consequently, shadows are very useful for conveying the three dimensional nature of rendered objects and for adding realism to computer generated scenes.

Generally, shadowing is similar to hidden surface removal. In hidden surface removal, objects or portions thereof are obscured because they are behind another object. For hidden surface removal, the point of reference for determining if an object is obscured is called a viewing point. For shadowing, objects or portions thereof are obscured because they are in the shadow of another object. In the shadowing case, the point of reference for determining if an object is obscured is a source light point. While many approaches exist for shadow mapping, depth map-based shadow algorithms are commonly used in graphics pipelines. Examples of such depth map-based shadow mapping algorithms are set forth in:

1) Lance Williams. Casting curved shadows on curved surfaces. In *Proceedings of SIGGRAPH'78*, pages 270–274, 1978;
2) Reeves, D. H. Salesin, R. L. Cook. Rendering anti-aliased shadows with depth maps. In *Proceedings of SIGGRAPH'87*, pages 283–291, 1987; and
3) M. Segal, C. Korobkin, R. van Widenfelt, J. Fordan, P. Haeberli. Fast Shadows and Lighting Effects Using Texture Mapping. In *Proceedings of SIGGRAPH'92*, pages 249–252, 1992.

which are each incorporated herein by reference in their entirety.

Prior Art FIG. 1 illustrates one depth map-based shadow algorithm 100 for generating realistic shadows. In such approach, there are two rendering passes 102 and 104. In the first pass 102, the scene is rendered from the point of view of a light source. The result is a depth map 106, or shadow map, which is essentially a two-dimensional function indicating the depth of the closest pixels to the light. In particular, each primitive, i.e. triangle, is scan-converted into pixels. A depth value, $z_{light}$, of the scanned fragment is interpolated across the primitive, and then is z-tested using a standard z-value (or any other depth value representation) buffer algorithm before being written out to the depth map 106. For additional information regarding such algorithm, reference may be made to the previously mentioned references in addition to: E. Catmull. A hidden surface Algorithm with Anti-Aliasing. In *Siggraph'78*, Page 6–11. 1978, which is incorporated herein by reference in its entirety.

Prior Art FIG. 2A illustrates the prior art technique 200 of building the shadow map using the standard z-buffer algorithm. As shown, distances 202 between a light source 204 and exposed surfaces of objects 206 are collected from a z-buffer. Depth values which are representative of the distances 202 are then utilized to generate the depth map 106.

For reasons that will soon become apparent, a polygon offset function may be performed in operation 108 for resolving a common self-shadowing aliasing problem. As an option, the polygon offset operation may include the "glPolygonOffset" operation in accordance with the OpenGL® programming language.

In the second pass 104, the scene is rendered from the eye space. During the second pass 104, each primitive is scanned into the screen from the eye space. However, the position (x,y,z) in the eye space can be transformed via a standard projective texture mapping operation 110 into the light space to get a texture coordinates (s,t,r), where (s,t) are the texture coordinates of the sampled three-dimensional point projected on the depth map 106, while r is the depth value that corresponds to the distance of the sampled point to the light source. In the second pass it is important to note that the distance value, r, can possibly be scaled by a percentage value, hence is offset by a small percentage amount using the texgen matrix or a vertex program.

Thereafter, in operation 112, the depth value at the sampling point, r, is then compared with the offset depth value, $z_{light}$, stored in the depth map 106 generated in the first pass 102 to yield a light-occlusion result, i.e. $r>z_{light}$, if the sampled point is behind some objects which are closer to the light, hence it is in the shadow of those objects. The resultant binary shadow values are then used to shade the current scanned object, resulting in shadow effects. Prior Art FIG. 2B illustrates the various variables associated with the calculations carried out during the second pass 104. Finally, a shadow modulation operation 114 is performed, the details of which will be set forth hereinafter.

Since this two-pass approach requires resampling the depth map 106 in the second pass 104, the problem of self-shadow aliasing may occur. Prior Art FIG. 2C illustrates such aliasing problem that arises when shadow mapping in accordance with Prior Art FIGS. 1–2B. In particular, complications arise when various points on the objects 206 are rendered in light space via a single texel 210 during the first pass 102, and subsequently rendered by way of separate pixels 212 in eye space during the second pass 104.

Prior Art FIG. 3A illustrates the offset operation 108 of Prior Art FIG. 1 which represents a solution to the aliasing problem of Prior Art FIG. 2C. As shown, the depth value, $z_{light}$, may be bounded by the "glPolygonOffset" operation. In particular, the "glPolygonOffset" operation includes calculating an offset value, o, using Prior Art Equations A.

$z_{light} = z + o$, where:

$o = m*\text{factor} + r*\text{units}$, where:

$m = \max(abs(\delta z/\delta x), abs(\delta z/\delta y))$, where    Equations A r is defined in Prior Art FIG. 2B, factor=a scalar that scales the maximum depth slope m of the polygon; and units=a scalar that scales an implementation-dependent constant that relates to the usable resolution of the depth buffer. Both factor and units may be positive or negative.

See equations 3.6 and 3.7 of the OpenGL 1.2.1 specification that can be found at http://www.opengl.org/Documentation/Specs.html, and which is incorporated herein by reference.

By offsetting the depth value, $z_{light}$, the self-shadow aliasing of Prior Art FIG. 2C is avoided. In particular, the offset operation dynamically compensates for the depth variation within each texel of the depth map 106.

Prior Art FIG. 3B illustrates a limitation associated with the prior art solution of Prior Art FIG. 3A. In some instances the values $\delta z/\delta x$ and $\delta z/\delta y$ of Equations A are unbounded due to the severe depth slopes of the nearly edge-on objects 206. This can lead to erroneous results, i.e. false shadows, when using the offset equation set forth hereinabove.

Various additional prior art techniques have been developed for addressing the problem of self-shadow aliasing. For example, shadows can be softened at the shadow boundaries, as set forth in the following document: W. Reeves, D. H. Salesin, R. L. Cook. Rendering antialiased shadows with depth maps. In *Proceedings of SIGGRAPH'87*, pages 283–291, 1987, which is incorporated herein by reference in its entirety. Variations of this technique are widely used and implemented for real or non-real time systems. Yet another solution includes the "SGIX_shadow" operation in accordance with the OpenGL® programming language.

Other techniques that can be used to suppress aliasing artifacts include:

1) Increasing the shadow map spatial resolution. This increases the number of depth samples to compare against, which results in a more accurate shadow.

2) Jittering the shadow map samples by modifying the projection in the texture transformation matrix. The results of the depth comparisons can then be averaged to smooth out shadow edges.

3) Modifying the texture projection matrix so that the r values are biased by a small amount. Further, the r values may be scaled, thus moving the objects a little closer to the light. This prevents sampling errors from causing a curved surface to shadow itself. This r scaling can also be done with the offset operation.

Additional solutions to the self-shadowing aliasing problem are set forth in:

1) A. Woo. The Shadow Depth map revisited. In *Graphics Gen III*, pages 338–342, 1992;

2) M. Woo, J. Neider, T. Davis. In *OpenGL programnzing Guide*, second edition, version1.1.1997;

3) M Kilgard. Shadow Mapping with Today's OpenGL Hardware. GDC 2000:Advanced OpenGL Game Development, 2000;

4) Wolfgang Heidrich, PhD thesis, 1999;

5) Alan Watt and Mark Watt, Advanced Animation and Rendering Techniques. By ACM Press, New York, N.Y. 1992, which are each incorporated herein by reference in their entirety.

While the foregoing techniques address the self-shadow aliasing problem by reducing the associated affects, they still merely provide a balance between efficiency and limitation issues. There is thus a need for an improved shadowing algorithm in a graphics pipeline that exploits the strengths of the prior art techniques such as the offset operation, while avoiding the problems and limitations associated therewith.

In operation 114, a shadow modulation process with the current standard openGL graphics pipeline is carried out in a single function:

$$\text{Color} = (1-s)*(\text{color\_amb} + \text{color\_diff} + \text{color\_spec}),$$

where s is a shadow variable, Color_diff is a diffuse color variable, Color_spec is a specular color variable, and Color_amb is an ambient color variable. This technique is very limited in its flexibility since it shadows a superposition of diffuse color and ambient color by simply adding them before entering the pixel shading logic. There is thus a further need for a shadowing algorithm in a graphics pipeline that includes a flexible way of implementing shadow modulation.

DISCLOSURE OF THE INVENTION

A system, method and article of manufacture are provided for shadow mapping while rendering a primitive in a graphics pipeline. Initially, an offset operation is performed in order to generate a depth value while rendering a primitive. Further, a value of a slope associated with a triangle is identified. Thereafter, the depth value is conditionally clamped to the depth gamut of the triangle based on the value of the slope of the triangle.

In one embodiment of the present invention, the shadow mapping process includes rendering the primitive from a light space perspective. The offset operation may include a polygon offset operation in accordance with the OpenGL® programming language. Further, the depth value may be clamped if the value of the slope is greater than a predetermined amount.

In another embodiment of the present invention, the clamping may include identifying vertex depth values of vertices of the primitive, and comparing at least one of the vertex depth values with the depth value generated by the offset operation. Thereafter, the depth value generated by the offset operation may be clamped based on the comparison.

In one aspect, the depth value generated by the offset operation may be clamped to the offset operation depth value if such depth value is greater than the least vertex depth value. Further, the depth value generated by the offset operation may be clamped to the least vertex depth value if the least vertex depth value is greater than the depth value generated by the offset operation.

In another aspect, the depth value generated by the offset operation may be clamped to the offset operation depth value if such offset operation depth value is less than the greatest vertex depth value. Further, the depth value generated by the offset operation may be clamped to the greatest vertex depth value if the greatest vertex depth value is less than the depth value generated by the offset operation.

In accordance with another embodiment of the present invention, a technique may be provided for performing shading calculations in a graphics pipeline. Initially, a first shading calculation may be performed in order to generate output, after which such output may be saved. A second shading calculation may also be performed using the saved output in order to generate further output.

In one embodiment, the first shading calculation may include:

$$[(1-s)*(Color\_diff+Color\_spec)]$$

for generating an output A, and the second shading calculation may include:

$$[Color\_amb+A],$$

where s is a shadow variable, Color_diff is a diffuse color variable, Color_spec is a specular color variable, and Color_amb is an ambient color variable. It should be noted that s, the shadow variable, generally takes values in the range 0.0 to 1.0, where 0.0 could represent being completely unshadowed and 1.0 being completely shadowed. The shadow variable s is computed by normal texture filtering of the results obtained in the second pass of the shadow algorithm.

In yet another embodiment, the first shading calculation may include:

$$[((1-s)*Color\_diff)+Color\_amb]$$

for generating an output A, and the second shading calculation may include:

$$[A*Texture\_det+(1-s)*Color\_spec],$$

where s is a shadow variable, Color_diff is a diffuse color variable, Color_spec is a specular color variable, Color_amb is an ambient color variable, and Texture_det is a detail texture variable.

As such, the first and second shading calculations may together include a diffuse color variable, a specular color variable, and an ambient color variable, while ensuring that such variables remain decoupled. These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

Prior Art

Prior Art

Prior Art

Prior Art

Prior Art

Prior Art

DESCRIPTION OF THE PREFERRED EMBODIMENTS

Figure 1:
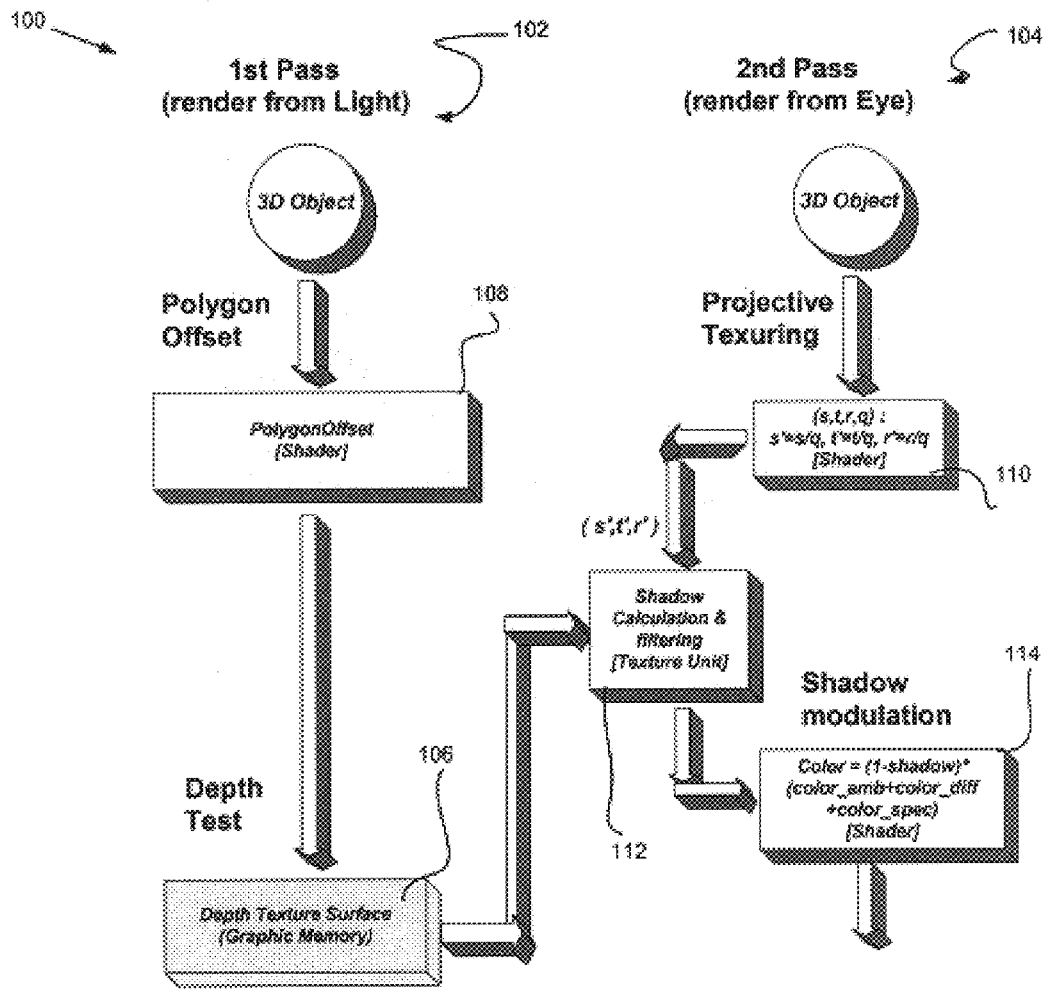
FIG. 1 illustrates a graphics pipeline with which shadow mapping may be performed in accordance with the prior art.
Figure 2A:
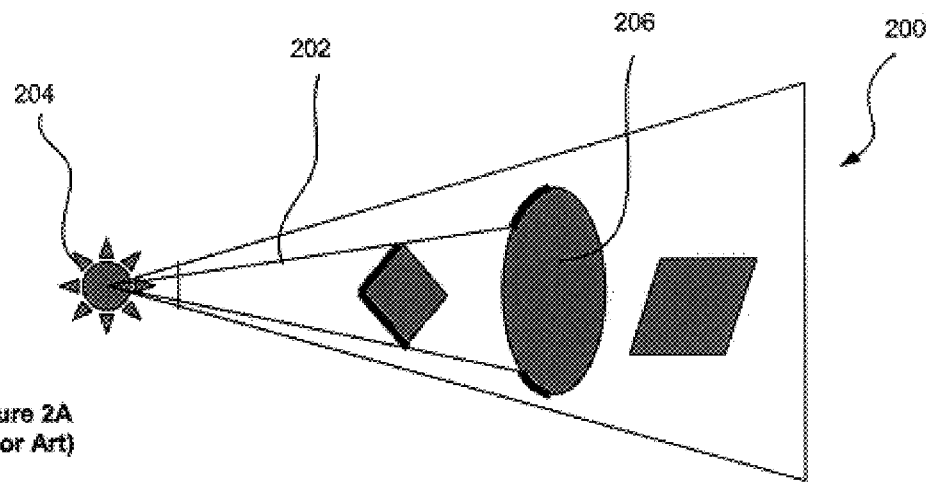
FIG. 2A illustrates a prior art technique of building shadow maps.
Figure 2B:
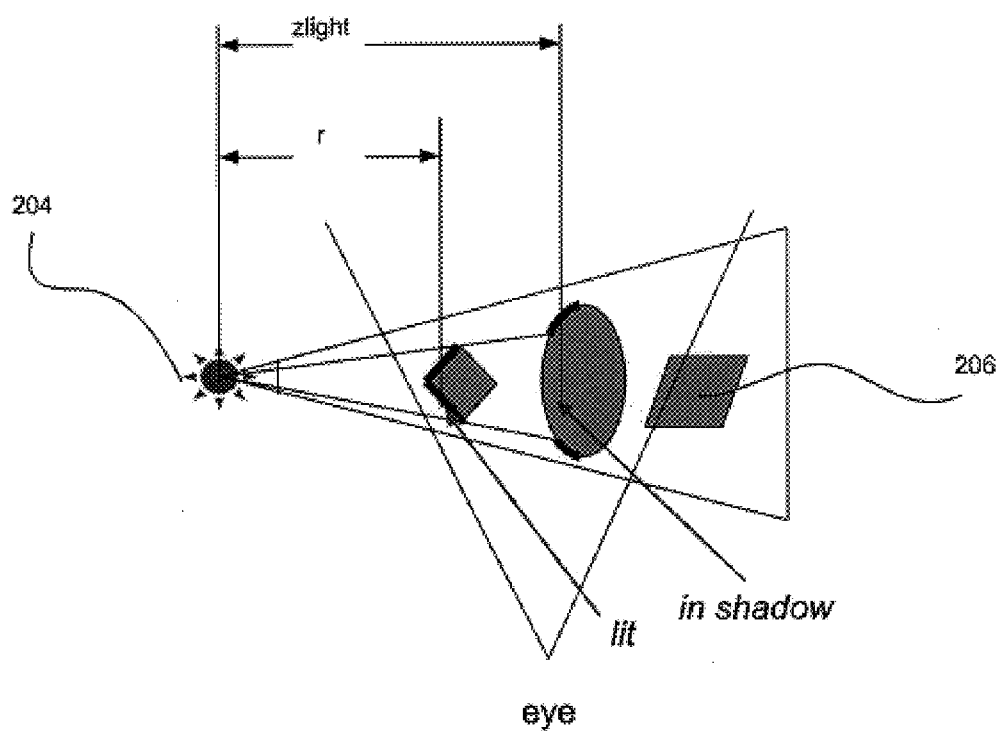
FIG. 2B illustrates a prior art technique of rendering shadow maps.
Figure 2C:
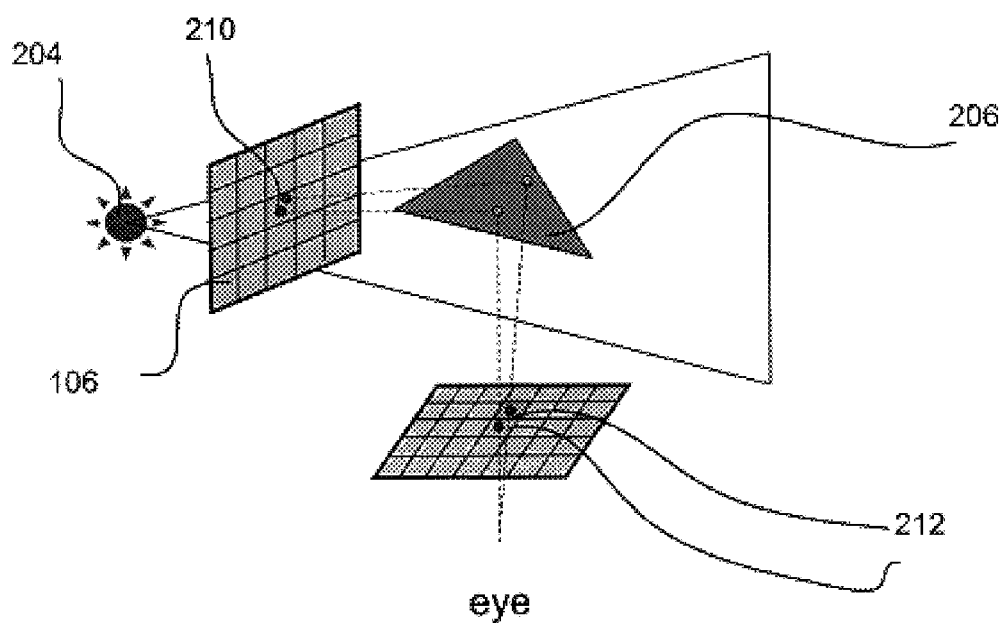
FIG. 2C illustrates an aliasing problem that arises when shadow mapping in accordance with Prior Art FIGS. 1–2B.
Figure 3A:
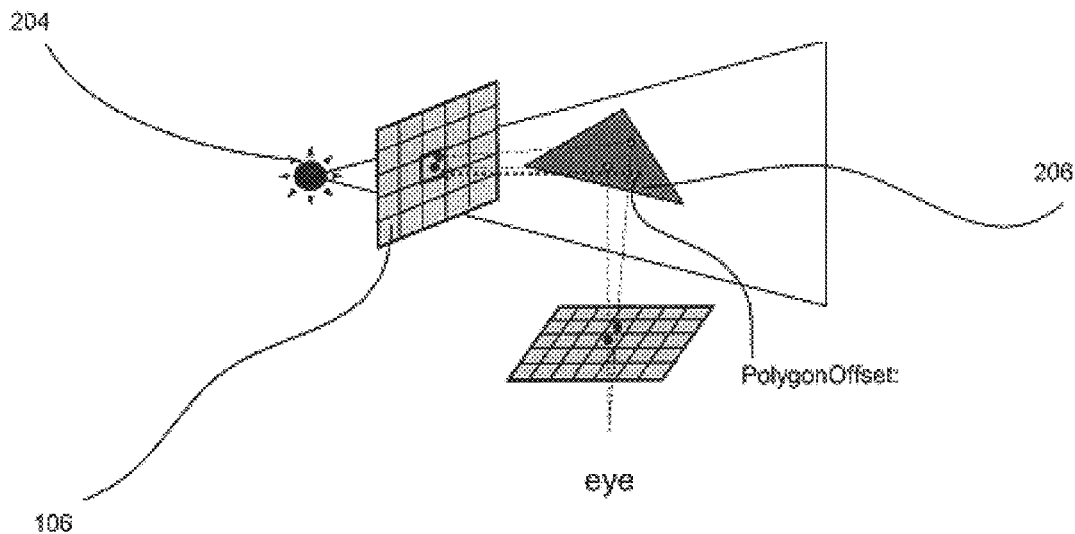
FIG. 3A illustrates a prior art solution to the aliasing problem of Prior Art FIG. 2C.
Figure 3B:
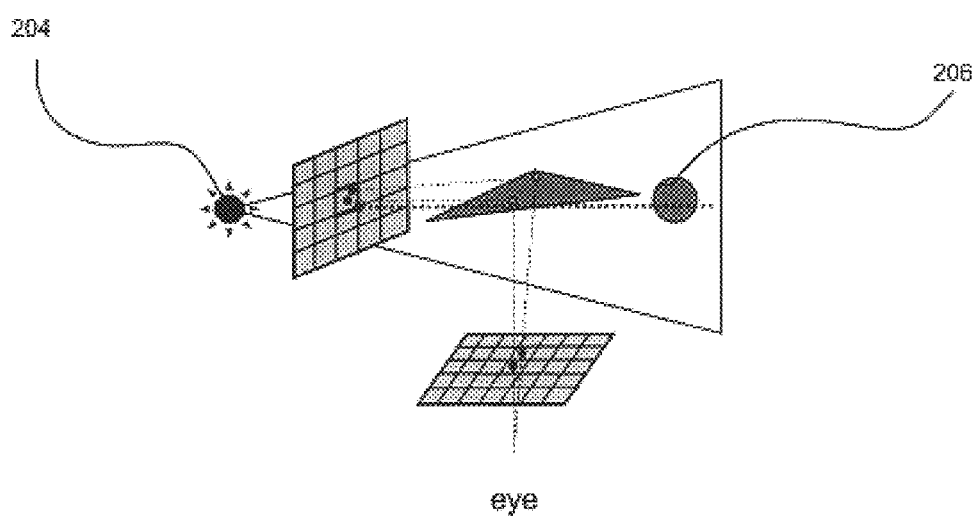
FIG. 3B illustrates a limitation associated with the prior art solution of Prior Art FIG. 3A.
Figure 4:
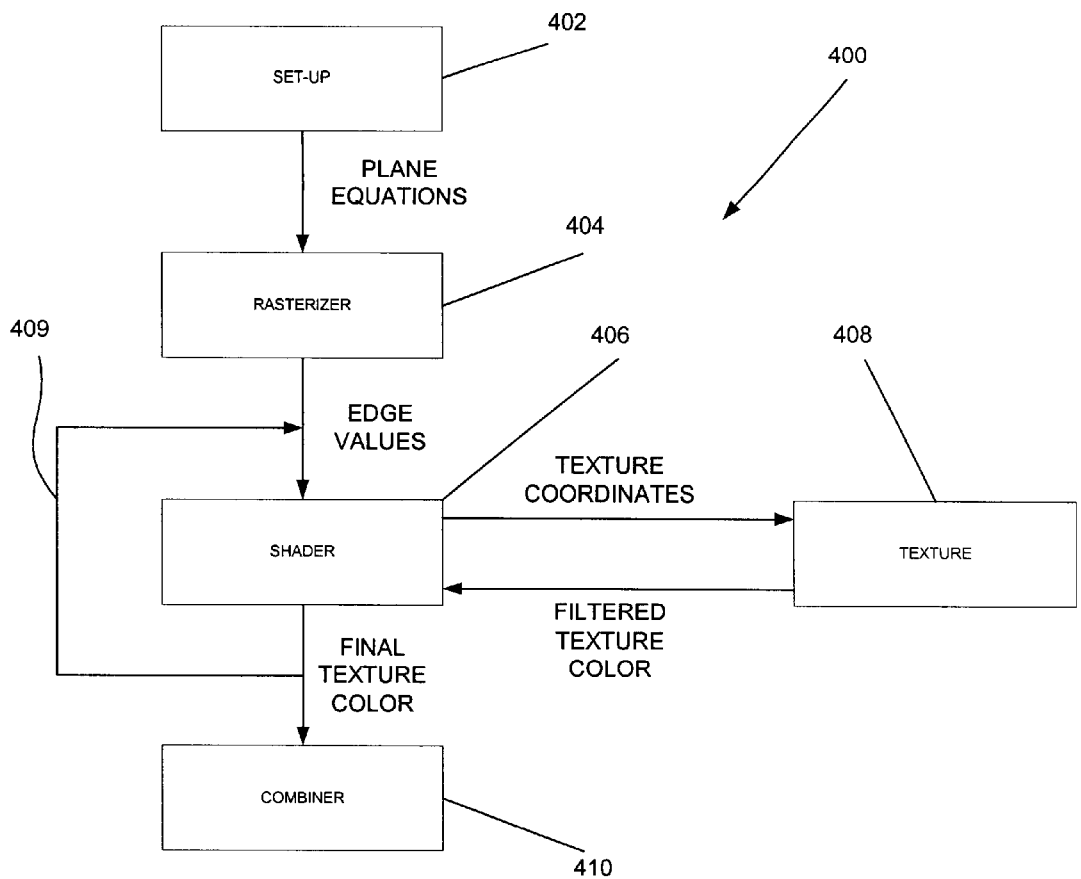
FIG. 4 illustrates a hardware implementation for programmable shading in accordance with one embodiment of the present invention.

FIGS. 1–3B illustrate the prior art. FIG. 4 shows an illustrative hardware implementation of the present invention. As shown, included is a set-up module 402, a rasterizer 404, a shader module 406, a texture fetch module 408, and a combiner 410 coupled to form a portion of a graphics processing pipeline 400. For reasons that will soon become apparent, a feedback loop 409 is coupled between an output of the shader module 406 to an input thereof It should be noted that the set-up module 402, rasterizer 404, and combiner 410 operate in a conventional manner as set forth during reference to FIG. 1. While the combiner 410 may be implemented in any desired manner, one exemplary implementation is disclosed in a co-pending application entitled "GRAPHICS PIPELINE INCLUDING COMBINER STAGES" filed Mar. 22, 1999 under Ser. No. 09/273,975, issued under U.S. Pat. No. : 6,333,744, and naming David B. Kirk, Matthew Papakipos, Shaun Ho, Walter Donovan, and Curtis Priem as inventors, and which is incorporated herein by reference in its entirety.

With continuing reference to FIG. 4, the various inputs and outputs are shown for each of the components. As shown, the rasterizer 404 generates edge distances which are used by the shader module 406 and texture fetch module 408.

Also shown in FIG. 4 is an optional feedback first-in first-out (FIFO) buffer. When the feedback loop 409 is not utilized, the temporary data calculated internally by the present invention may be dropped before being sent to the texture fetch module 408.

As an option, however, the shader module 406 may be reused, and some of this data (like the barycentric coordinates) may be reused each time a particular group of pixels, or "quad," goes through the shader module 406. If new colors are generated during one pass, these colors may continuously be associated with the quad on subsequent passes. Further, more than one triangle may be processed at a time while employing the feedback loop 409, since data from several triangles generally appears while waiting for the texture fetch module 408 to calculate an individual texture look-up.

To address this, the loopback FIFO 407 may be utilized to hold barycentric weights, colors from previous passes, triangle information, and additional scheduling information to keep track of what the shader module 406 is supposed to do each pass. The FIFO 407 may include a plurality of bits that can be reconfigured to store whatever piece of data is appropriate. When the texture requests for a particular quad are sent to the texture fetch module 408, the associated data may also be placed in the FIFO 407. When the texture requests complete, the results may be combined with the data from the FIFO 407, and a small portion of logic may decide whether to send the completed quad to the combiner 410, or back around for another pass at the shader module 406.

Figure 5:
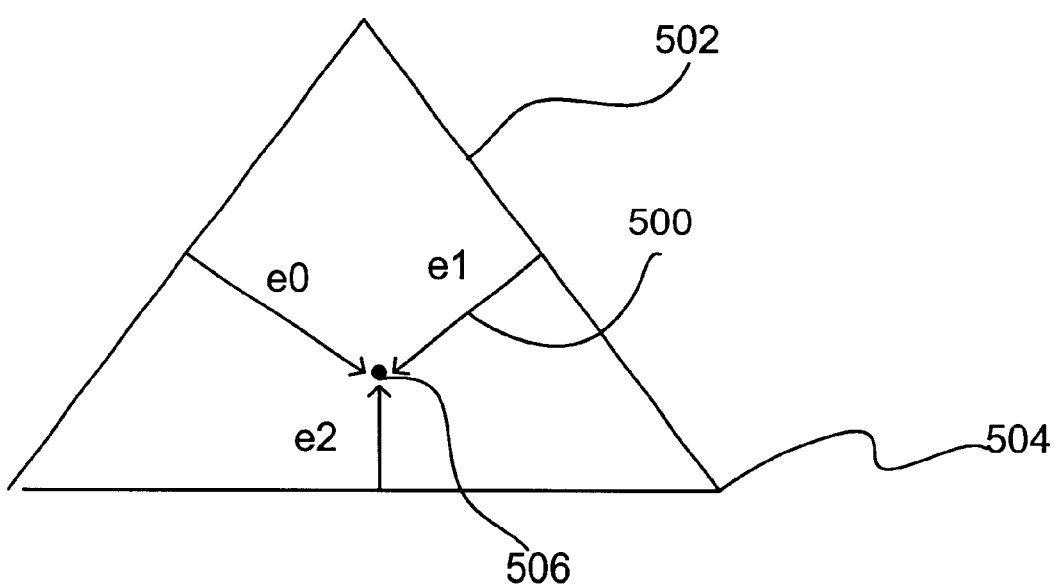
FIG. 5 illustrates a graphical representation of the edge distances generated by the rasterizer in accordance with one embodiment of the present invention.

FIG. 5 illustrates a graphical representation of the edge distances generated by the rasterizer 404. As shown, the edge distances ($e_0$, $e_1$, $e_2$) represent a perpendicular distance 500 from an edge 502 of a primitive 504 to a pixel 506 within the primitive 504. Such edge distances ($e_0$, $e_1$, $e_2$) thus identify the location of the pixel 506 within the primitive 504.

As a function of the shading calculations, various texture look-up operations may be carried out utilizing the texture look-up module 408 in order to obtain output having appropriate texture map colors. To accomplish this, texture coordinates may be sent to the texture look-up module 408. In response thereto, texture information is received from the texture look-up module 408. Such texture information may take any form including, but not limited to filtered texture color, etc.

During the course of use, the feedback loop 409 may be used for performing another shading calculation using the texture information from the texture look-up module 408 in order to generate further output. As an option, the texture information may include filtered texture look-up values for use in retrieving further texture information when the texture information retrieval operation is repeated. The present invention thus allows repeated texture information retrieval and shading calculations in an iterative, programmable manner. In other words, each iteration may be programmed to do a desired shading calculation with or without a texture look-up, where each subsequent iteration may use results of previous texture look-ups for generating further results.

Figure 6:
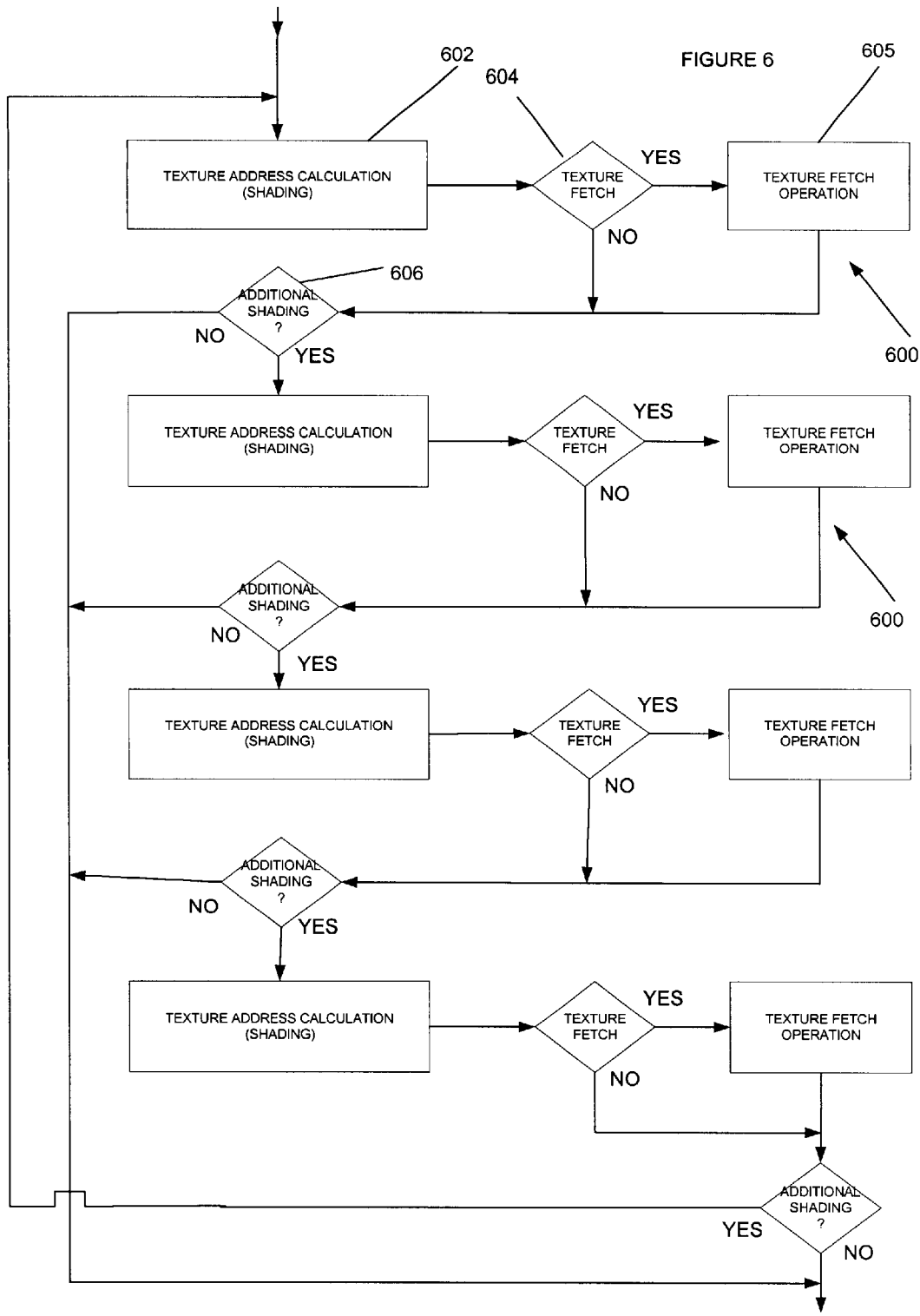
FIG. 6 illustrates a flow diagram depicting the manner in which the shading calculations are interweaved with the texture fetch operations in a plurality of iterations in accordance with one embodiment of the present invention.

In one embodiment of the present invention, at least a pair of texture look-up modules is coupled to a pair of shading modules which together constitute at least four logical modules. Further, the system may be capable of performing both interpolation and shading calculations including pre-texture shading calculations and post-texture shading calculations FIG. 6 illustrates a flow diagram depicting the manner in which the shading calculations are interweaved with the texture fetch operations in a plurality of iterations 600. As shown, each iteration 600 includes a shading calculation 602. During each shading calculation 602, a decision 604 may be made as to whether a texture look-up may be performed. If so, texture information may be retrieved during a texture look-up operation 605. Also during each iteration 600, another decision 606 is made as to whether an additional shading operation 602 is to be executed.

If it is determined in decision 606 that an additional shading operation 602 is to be performed, another iteration 600 is executed. On the other hand, if no further shading operations are to be executed, the process of FIG. 6 may be terminated. During use, the number of iterations may vary per the desires of the user.

As such, decision 604 allows additional texture information to be retrieved in subsequent shading calculations 600 based on previously retrieved texture information. It should be also noted that this may be done on different texture maps. In the alternative, it may be decided in decision 604 to not do a texture look-up, and merely perform a shading calculation 600 during a current iteration.

As mentioned earlier during reference to FIG. 4, the shading module 406 may carry out many various types of operations in order to produce output of various types based on the edge distances ($e_0$, $e_1$, $e_2$) generated by the rasterizer 404. Such output may include, but are not limited to diffuse output colors, fog output values, specular output colors, depth output values, texture color output values, a level of detail (LOD) value, and/or a Z-slope value. As an option, the calculation of a level of detail (LOD) may be performed based on the texture information that is previously retrieved.

Figure 7:
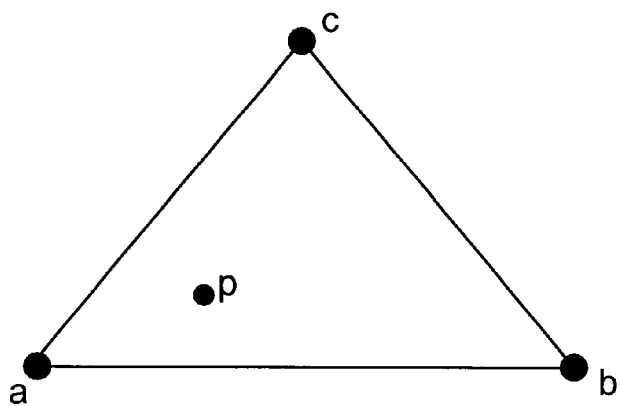
FIG. 7 illustrates a point within a primitive that is capable of being defined by barycentric weights.

In order to accomplish the foregoing shading operations set forth in FIGS. 4 and 6, perspective corrected barycentric weights ($g_0$, $g_1$, $g_2$) may be calculated from the edge distances ($e_0$, $e_1$, $e_2$). In a first embodiment, Equations #1 are utilized to calculate the perspective barycentric weights ($g_0$, $g_1$, $g_2$).

$$g0=e0*d$$

$$g1=e1*d$$

$$g2=e2*d, \text{ where} \qquad \text{Equations \#1}$$

$$s=e0*w0*w1+e1*w1*w2+e2*w2*w0$$

d=1/s, where
w0, w1 and w2 are the perspective correction factors used to perform hyperbolic or perspective corrected interpolation FIG. 7 illustrates a point within a primitive that is capable of being defined by barycentric weights ($g_0$, $g_1$, $g_2$). In particular, point (p) may be defined by Equation #2 in terms of the barycentric weights ($g_0$, $g_1$, $g_2$) and vertices (a, b, c) of the primitive. As an option, the perspective barycentric weights may use parameter values of the primitive in order to perform perspective corrected interpolation of vertex parameter values. Optionally, the perspective barycentric weights may use unclipped parameter values.

$$p=a*g_0+b*g_1+c*g_2 \qquad \text{Equation \#2}$$

Given the perspective corrected barycentric weights ($g_0$, $g_1$, $g_2$), the various shading calculations may be performed using the equations set forth in Table 1.

TABLE 1

Z in Screen Space(depth) - Calculate screen space z values at the vertices, then interpolate them per-pixel using the edge values as non-perspective corrected weights.
zs0 = zc0/wc0; zs1 = zc1/wc1; zs2 = zc2/wc2.
zs = ( e0 zs0 + e1 zs1 + e2 zs2 )/(e0 + e1 + e2 )
Fog - Interpolate the fog range (may be affine xform of z eye, or distance from eye point -- both computed per vertex).
Call fog range from xform fr.
fr = g0*fr0 + g1*fr1 + g2*fr2
then retrieve frac(fr) and run it through either:
   1) no table
   2) exp table
   3) exp^2 table
Note: This table could be implemented as a texture map lookup.
This would allow one to do an Opengl fog table.
4 (or any other number of) Non-projective 2-D Texture Coordinates - This optimization can only be done if all q's are one. Otherwise, the 2 projective case below is performed.

TABLE 1-continued

```
s = g0*s0 + g1*s1 + g2*s2
t = g0*t0 + g1*t1 + g2*t2
2-D Projective or Cube Texture Coordinates
2-D:

sq = g0*s0 + g1*s1 + g2*s2
tq = g0*t0 + g1*t1 + g2*t2
q = g0*q0 + g1*q1 + g2*q2, where
qi = 1/q
s = sq*qi
t = tq*qi
Cube:

sr = g0*s0 + g1*s1 + g2*s2
tr = g0*t0 + g1*t1 + g2*t2
rr = g0*r0 + g1*r1 + g2*r2
f = pickmax(s,t,r)
Note: f is a face index beginning at zero (for s). Pick is a function
that chooses the fth entry from the list passed to it, where f is first
parameter.
sr = pick(f,tr,rr,sr)
tr = pick(f,rr,sr,tr)
r = pick(f,sr,tr,rr), where
ri = 1/r
s = sr*ri
t = tr*ri
3-D projective textures -
sq = g0*s0 + g1*s1 + g2*s2
tq = g0*t0 + g1*t1 + g2*t2
rq = g0*r0 + g1*r1 + g2*r2
q = g0*q0 + g1*q1 + g2*q2, where
qi = 1/q
s = sq*qi
t = tq*qi
r = rq *qi
2-D dependent texture lookup -- After the first texture lookup, two
components of the argb color are reinterpreted as texture coordinates,
and looked up again.
Dx6 Bump Mapping - After the first texture look- up, color r0,g0,b0 is
received which is multiplied by 2x2 basis matrix, which is constant.
s1 and t1 are the interpolated texcoords for the second look-up.
s1p = m11*r0 + m12*g0 + s1
t1p = m21*r0 + m22*g0 + t1
After the second texture lookup, received is r1,g1,b1,a1.
f = (b0*m31 + m32)
r1p = r1*f
g1p = b1*f
b1p = b1*f
a1p = a1
Polygon Offset - let the notation z(1,0) indicate the z value of the pixel in
the bottom right corner of the pixel block, or quad. z(0,1) would be the
top left.
compute the z slopes:
zx0 = z(1,0) – z(0,0)
zy0 = z(0,1) – z(0,0)
factor = max(abs(zx0),abs(zy0))
compute a new z:
zo = z + factor*zs + units, where factor and units are state. Loaded with
pipelined state bundles.
Dot Product-based texture mapping - Using s0, t0, a first texture look-up
is
performed. Call the results a0 b0 c0. Dot products are taken between these
values and the subsequent texture coordinates to generate a new set of
texture coordinates for a subsequent texture lookup:
sp = s1 * a0 + t1 * b0 + r1 * c0
tp = s2 * a0 + t2 * b0 + r2 * c0
2-D texture lookup performed using (sp, tp).
or
sp = s1 * a0 + t1 * b0 + r1 * c0
tp = s2 * a0 + t2 * b0 + r2 * c0
rp = s3 * a0 + t3 * b0 + r3 * c0
3-D texture lookup performed using (sp, tp, rp)
or
Cube Texture coordinates performed (as above) using (sp, tp, rp)
Reflective Bump Mapping - Using s0, t0, a first texture look-up is
performed. Call the results hs,ht,hr. this is the normal in tangent space.
interpolate s1, t1, r1 -- this is the surface tangent vector in eye space
interpolate s2, t2, r2 -- this is the surface binormal vector.
interpolate s3, t3, r3 -- this is the surface normal vector.
```

TABLE 1-continued

```
These are used as a basis matrix by which to multiply the vector hs,ht,hr.
This will give the normal in eye space.
so,
nx = s1*hs + s2*ht + s3*hr;
ny = t1*hs + t2*ht + t3*hr;
nz = r1*hs + r2*ht + r3*hr;
Use the (nx,ny,nz) vector as a cube map lookup for the diffuse lighting
component.
Now compute the reflection vector per pixel.
let ne = nx*ex+ny*ey+nz*ez;
let n2 = nx*nx + ny*ny + nz*nz;
rx = 2*nx*ne/n2 – ex;
ry = 2*ny*ne/n2 – ey;
rz = 2*nz*ne/n2 – ez;
Use this reflection vector as a cube map lookup.
Depth Texture Mapping with Dot Products - Using s0, t0, a first texture
look-up is performed. Call the results a0, b0, c0. Dot products are
performed between these values and two subsequent sets of texture
coordinates to produce z clip and w clip values. These quotient of
these values replaces the previously calculated z screen value.
zc = a0 * s1 + b0 * t1 + c0 * r1;
wc = a0 * s2 + b0 * t2 + c0 * r2;
zs = zc/wc
Pixel culling - The s, t, r, and q coordinates for a particular texture
are interpolated per-pixel. Each coordinate is individually configured to
check for either negative or non-negative values. If the texture coordinate
matches the configuration, the pixel is culled (flot drawn).
Isotropic BRDF - The results of two texture coordinate lookups are
interpreted as 16-bit numbers, h0, l0 and h1, l1. A third texture lookup is
performed using (h0, h1, l0–l1).
```

It should be understood that each of the options set forth in the foregoing tables may be adapted to reuse common portions of the hardware set forth in FIG. 4. As set forth earlier, such hardware is capable of interpolating and performing texture address calculations during general operation.

Table 1 is based on perspective corrected barycentric weights ($g_0$, $g_1$, $g_2$). In another embodiment, non-perspective corrected barycentric weights ($g_0$, $g_1$, $g_2$) may be utilized which are defined in Equations #5. Non-perspective corrected barycentric weights replace perspective correct weights when texture coordinates, colors, depth, or fog are being interpolated.

$$g0 = e0*d$$

$$g1 = e1*d$$

$$g2 = e2*d, \text{ where} \qquad \text{Equations \#5}$$

$$s = e0 + e1 + e2$$

$$d = 1/s$$

Figure 8:
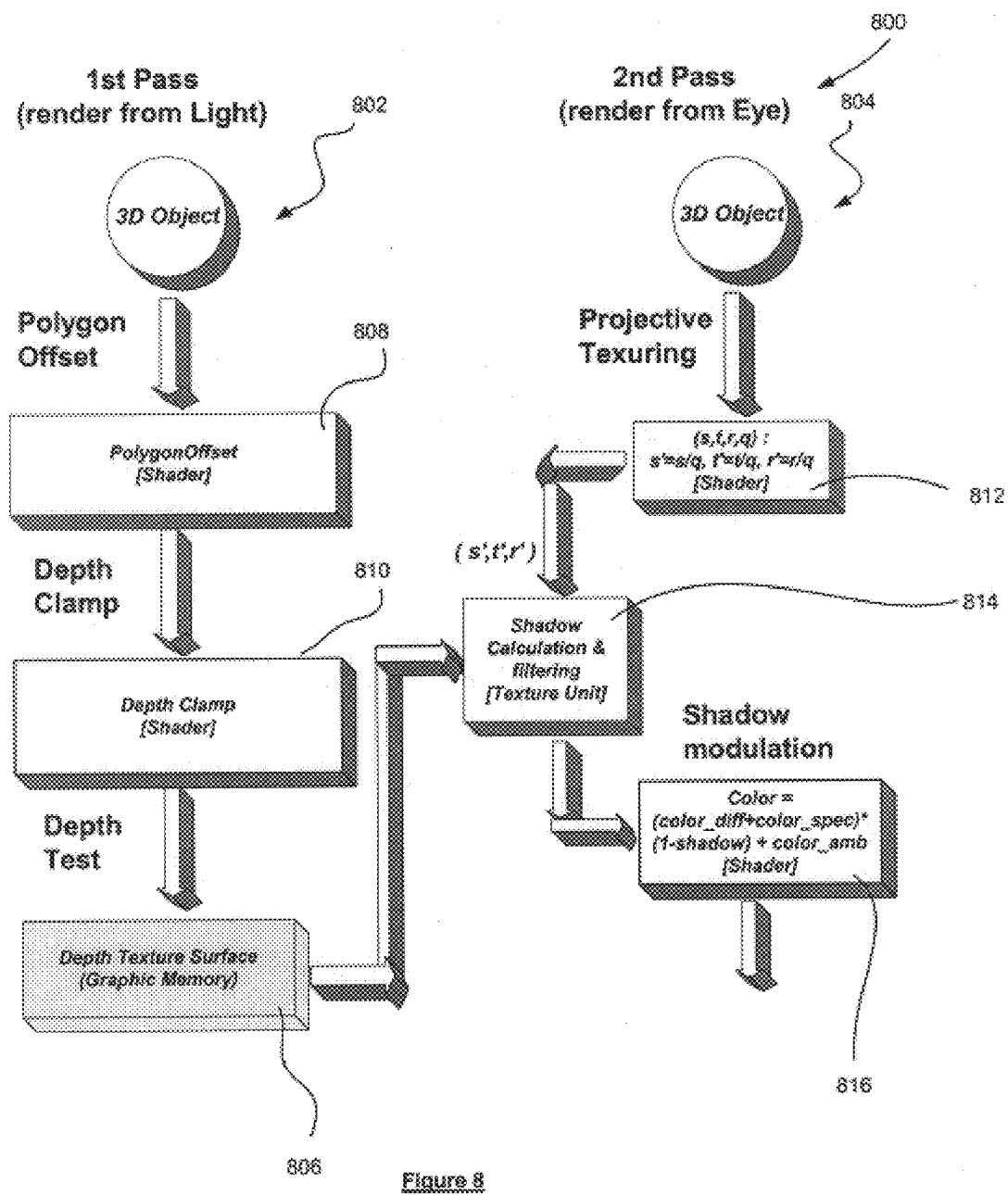
FIG. 8 illustrates a graphics pipeline with which shadow mapping may be performed in accordance with the present invention.

FIG. 8 illustrates a graphics pipeline 800 with which a shadow mapping technique may be performed in accordance with one embodiment of the present invention. In such approach, there are two rendering passes 802 and 804, similar to the technique of Prior Art FIG. 1. In the first pass 802, the scene is rendered from the point of view of a light source resulting in a depth map 806, or shadow map, and a polygon offset function is performed in operation 808, as set forth during reference to Prior Art FIG. 1.

In addition, a clamping operation 810 is performed for clamping the depth value, $z_{light}$, based on a slope threshold value. Additional information regarding the clamping operation 810 will be set forth during reference to FIG. 9. By performing this clamping operation 810, shadow aliasing is avoided in operations 812 and 814 of the second pass 804.

Finally, a shadow modulation operation 816 is performed that is very flexible in that it employs the feedback architexture set forth in FIG. 4. Additional information regarding the manner in which the shadow modulation operation 816 is executed will be set forth during reference to FIG. 11.

Figure 9:
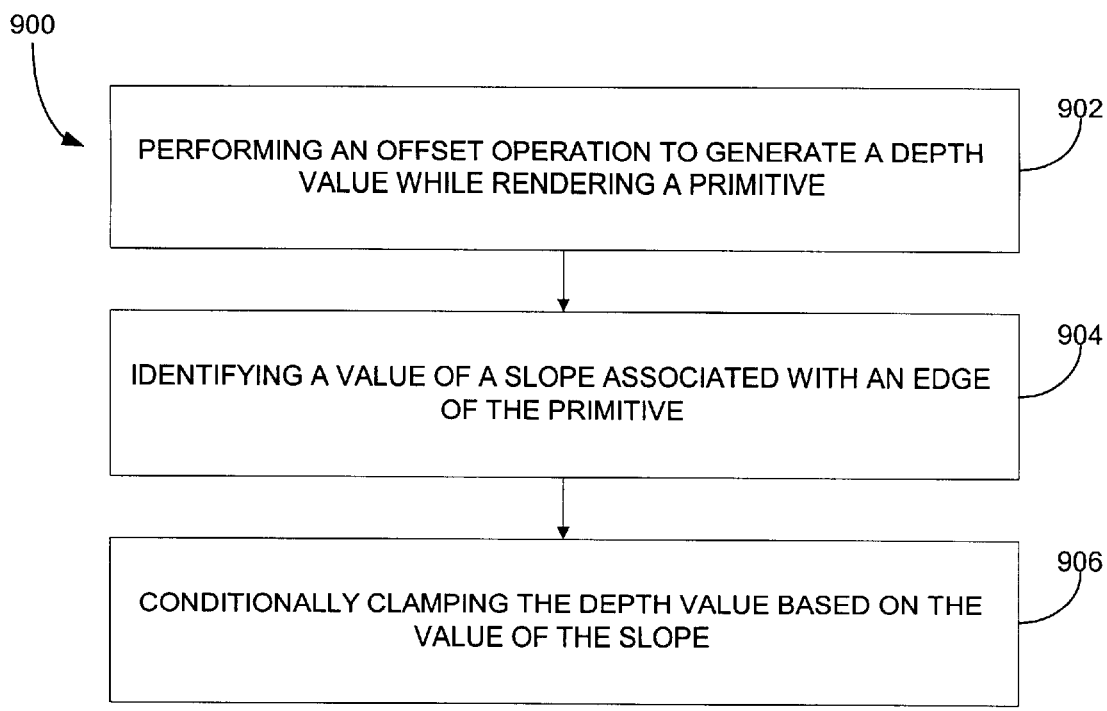
FIG. 9 illustrates a method for shadow mapping while rendering a primitive in a graphics pipeline.

FIG. 9 illustrates a method 900 for shadow mapping while rendering a primitive in a graphics pipeline, as set forth in FIG. 8. In one embodiment, the various operations associated with method 900 may be carried out by the shader module 406 and/or texture module 408 of FIG. 4, or any other desired module.

Initially, in operation 902, an offset operation is performed in order to generate a depth value, i.e. $z_{light}$, while rendering a primitive. In one embodiment, the offset operation may include the "PolygonOffset" operation in accordance with the OpenGL® programming language. It should be noted that in the present description, the term depth value may refer to a standard z-value, w-value, and/or any other depth-related dimension pertaining to the graphics arts.

Thereafter, in operation 904, a value of a principle slope associated with a primitive is identified. Next, the depth value, $z_{light}$, is conditionally clamped based on the value of the slope, as indicated in operation 906. In particular, the depth value, $z_{light}$, may be clamped to the depth gamut of the primitive if the value of the slope is greater than a predetermined amount, namely a shadow slope threshold. This threshold may be determined by the graphics application being utilized, or by any other means per the desires of the user. Further, the shadow slope threshold may be set once per frame, or more often. During operation 906, the depth value, $z_{light}$, may be clamped in different ways as determined in operation 808 of FIG. 8.

The purpose of conditionally clamping the offsetted value is to reduce artifacts caused by "edge-on" primitives. In the present description, an edge-on primitive refers to a primitive whose z gradients are large; i.e., exceed a specified threshold. In other embodiments, the depth value, $z_{light}$, generated by the offset operation may be compared to any predetermined vertex depth value associated with the primitive vertices, and clamped accordingly in order to prevent shadow aliasing. By limiting the depth value within each primitive after the offset operation is performed, the depth ambiguity between objects at different layers can be greatly reduced, and the ghost shadow artifacts may be eliminated very effectively.

Recall the computation of $z_{light}$ from Equations A:

$z_{light} = z + o$, where:

$o = m*\text{factor} + r*\text{units}$, where:

$m = \max(abs(\delta z/\delta x), abs(\delta z/\delta y))$, Equations A (set forth hereinabove)

Figure 9A:
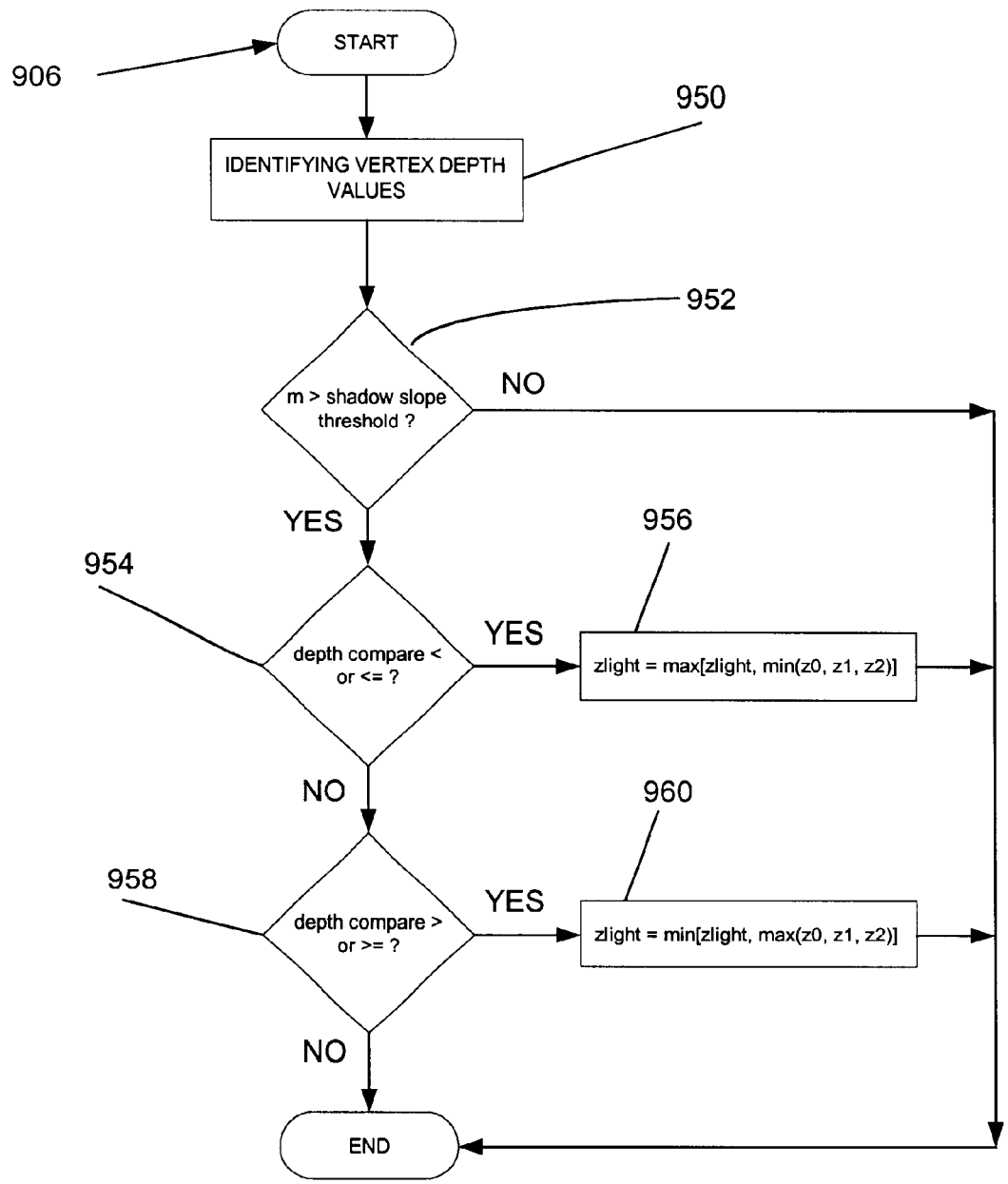
FIG. 9a illustrates an exemplary method by which the depth value is clamped in operation 906 of FIG. 9.

FIG. 9a illustrates the manner in which the depth value, $z_{light}$, is clamped in operation 906 of FIG. 9. As shown, the clamping includes initially identifying vertex depth values, $z_0, z_1, z_2$, of vertices of the primitive. Note operation 950. It should be noted that any number of vertex depth values may be identified based on the nature of the primitive.

Thereafter, at decision 952 it is decided whether any modification to the computed polygon-offsetted $z_{light}$ value is desired. If the slope m computed as an intermediate value in the polygon offset operation is not greater than the application-specified shadow slope threshold, no modification is done. Otherwise, control proceeds to decision 954.

If it is decided in decision 954 that the depth buffer depth compare operation is <(LESS THAN) or <=(LESS THAN OR EQUAL TO), the offsetted value, $z_{light}$, generated by the offset operation may be clamped to the maximum of $z_{light}$ and the least vertex depth value, $\min(z_0, z_1, z_2)$. See operation 956. Equation #6 illustrates the equation by which operation 956 is carried out.

$$z_{light} = \max[z_{light}, \min(z_0, z_1, z_2)] \quad \text{Equation \#6}$$

Otherwise, if it is decided in decision 958 that that the depth buffer depth compare operation is >(GREATER THAN) or >=(GREATER THAN OR EQUAL TO), the offsetted value, $z_{light}$, generated by the offset operation may be clamped to the minimum of the $z_{light}$ and the greatest vertex depth value, $\max(z_0, z_1, z_2)$. See operation 960. Equation #7 illustrates the equation by which operation 960 is carried out.

$$z_{light} = \min[z_{light}, \max(z_0, z_1, z_2)] \quad \text{Equation \#7}$$

Otherwise, $z_{light}$ is not modified.

Figure 10:
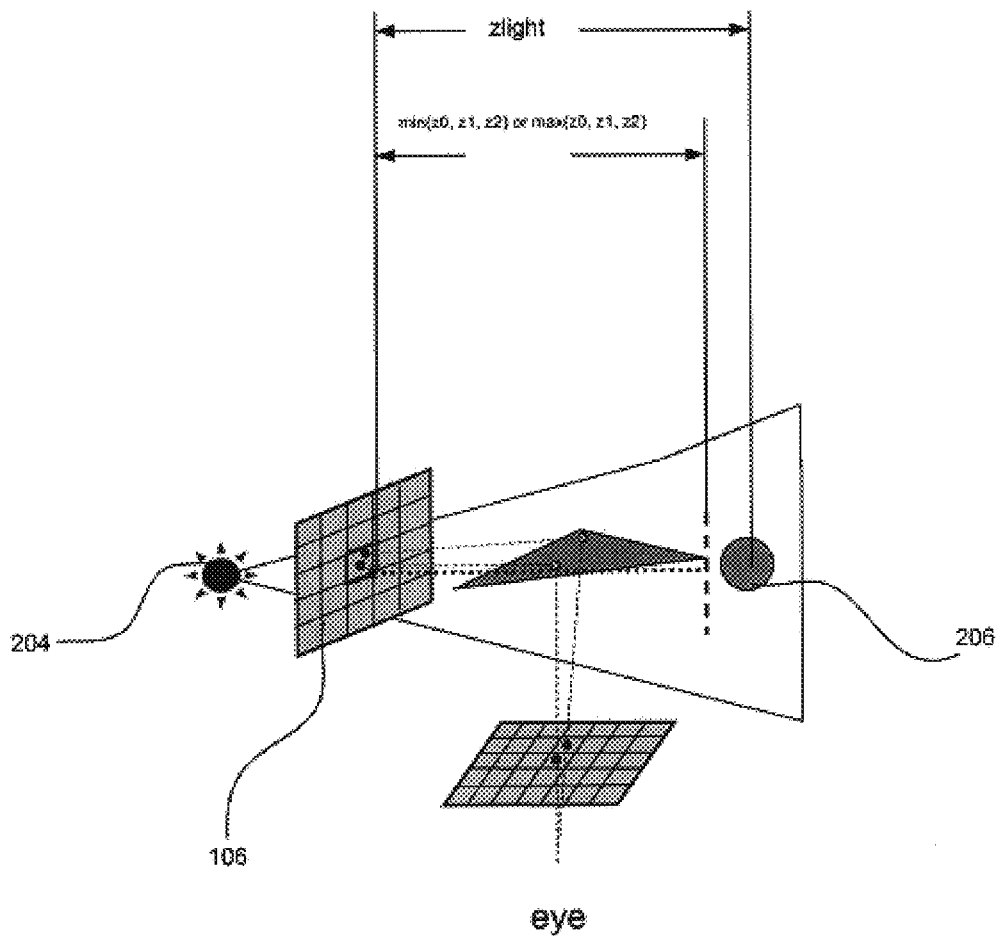
FIG. 10 is a diagram illustrating the manner in which the depth value is clamped in accordance with the method of FIG. 9.

FIG. 10 is a diagram illustrating the manner in which the depth value, $z_{light}$, is clamped in accordance with the method of FIG. 9. As shown, the depth value, $z_{light}$, generated by the offset operation may be clamped to $\min(z_0, z_1, z_2)$ or $\max(z_0, z_1, z_2)$, thus preventing erroneous results when employing the offset operation 902 of FIG. 9.

Figure 11:
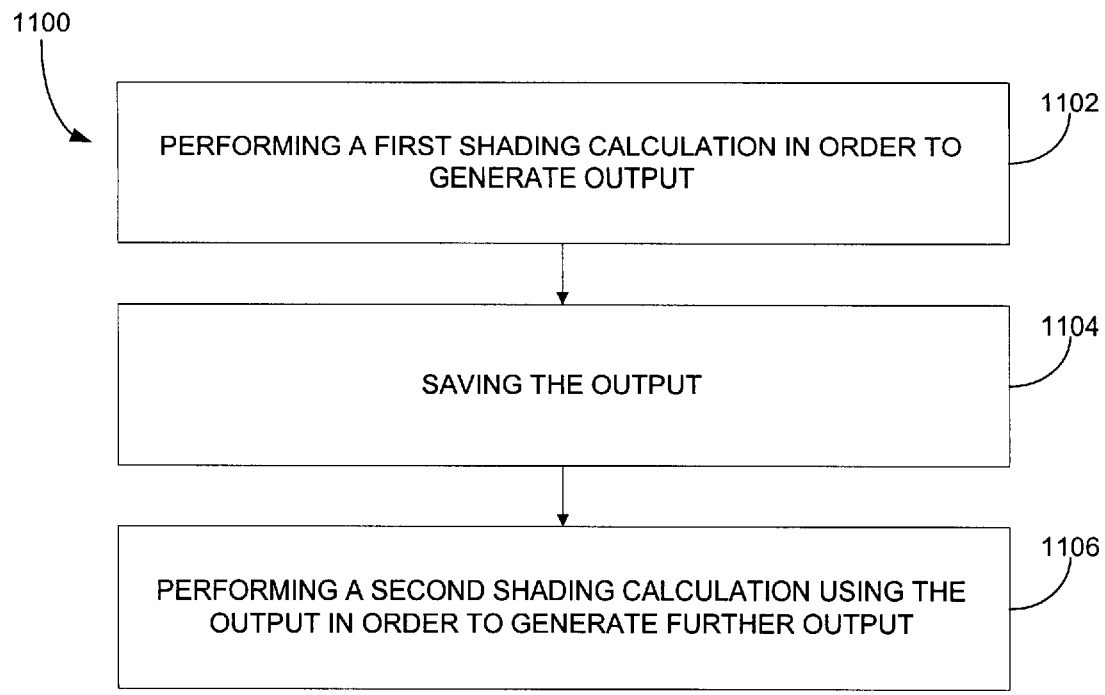
FIG. 11 illustrates a method for performing shading calculations in a graphics pipeline in accordance with one embodiment of the present invention.

FIG. 11 illustrates a method 1100 for performing shading calculations in a graphics pipeline in accordance with one embodiment of the present invention. Initially, in operation 1102 a first shading calculation may be performed in order to generate output, after which such output may be saved in operation 1104. A second shading calculation may also be performed in operation 1106 using the previous output in order to generate further output. In one embodiment, the various operations associated with method 1100 may be carried out by the shader module 406 and/or texture module 408 of FIG. 4, or any other desired module.

As an option, the first shading calculation may include:

$[(1-s)*(\text{Color\_diff} + \text{Color\_spec})]$ for generating an output A, and the second shading calculation includes:

$[\text{Color\_amb} + A]$, where s is a shadow variable, Color_diff is a diffuse color variable, Color_spec is a specular color variable, and Color_amb is an ambient color variable.

In another embodiment, the first shading calculation may include:

$[((1-s)*\text{Color\_diff}) + \text{Color\_amb}]$ for generating an output A, and the second shading calculation includes:

$[A*\text{Texture\_det} + (1-s)*\text{Color\_spec}]$, where s is a shadow variable, Color_diff is a diffuse color variable, Color_spec is a specular color variable, Color_amb is an ambient color variable, and Texture_det is a texture detail variable.

As such, the first and second shading calculations may together include a diffuse color variable, a specular color variable, and an ambient color variable. Such variables are further decoupled which allows very flexible shadowing operations, including but not restricted to the shadows generated by semi-transparent objects, anti-shadows, etc.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for shadow mapping while rendering a primitive in a graphics pipeline, comprising:
   (a) performing an offset operation to generate a depth value while rendering a primitive;
   (b) identifying a value of a slope associated with a prirnitive; and
   (c) conditionally clamping the depth value based on the value of the slope.

2. The method as recited in claim 1, wherein the shadow mapping includes rendering the primitive from a light space perspective.

3. The method as recited in claim 1, wherein the depth value is clamped if the value of the slope is greater than a predetermined amount.

4. The method as recited in claim 1, wherein the clamping includes the steps of:
   identifying vertex depth values of vertices of the primitive; comparing at least one of the vertex depth values with the depth value generated by the offset operation; and clamping the depth value generated by the offset operation based on the comparison.

5. The method as recited in claim 1, wherein the offset operation includes a polygon offset operation in accordance with the OpenGL® programming language.

6. A computer program embodied on a computer readable medium for shadow mapping while rendering a primitive in a graphics pipeline, comprising:
   (a) a code segment for performing an offset operation to generate a depth value while rendering a primitive;
   (b) a code segment for identifying a value of a slope associated with a slope of the primitive; and
   (c) a code segment for conditionally clamping the depth value based on the value of the slope.

7. The computer program as recited in claim 6, wherein the depth value is clamped if the value of the slope is greater than a predetermined amount.

8. The computer program as recited in claim 6, wherein the clamping includes: identifying vertex depth values of vertices of the primitive; comparing at least one of the vertex depth values with the depth value generated by the offset operation; and clamping the depth value generated by the offset operation based on the comparison.

9. A system for shadow mapping while rendering a primitive in a graphics pipeline, comprising:
   (a) logic for performing an offset operation to generate a depth value while rendering a primitive;
   (b) logic for calculating and identifying a value of a slope associated with the primitive; and
   (c) logic for conditionally clamping the depth value based on the value of the slope.

10. A method for performing shading calculations in a graphics pipeline, comprising:
    performing a first shading calculation in order to generate output during a first pass;
    saving the output; and
    performing a second shading calculation using the output in order to generate further output during a second pass;
    wherein the first and second shading calculations together include a set of variables including a diffuse color variable, a specular color variable, and an ambient color variable;
    wherein a first subset of the variables is utilized by the first shading calculation during the first pass, and a second subset of the variables is utilized by the second shading calculation during the second pass such that the variables are decoupled at least in part.

11. The method as recited in claim 10, wherein:
    (i) the first shading calculation includes $[(1-s)*(Color\_diff+Color\_spec)]$ for generating an output A, and
    (ii) the second shading calculation includes, $[Color\_amb+A]$,
    where s is a shadow variable, Color_diff is a diffuse color variable, Color_spec is a specular color variable, and Color_amb is an ambient color variable.

12. The method as recited in claim 10, wherein:
    (i) the first shading calculation includes $[((1-s)*Color\_Diff)+Color\_amb]$ for generating an output A, and
    (ii) the second shading calculation includes $[A*Texture\_{det}+(1-s)*Color\_{spec}]$,
    where s is a shadow variable, Color_diff is a diffuse color variable, Color_spec is a specular color variable, Color_amb is an ambient color variable, and Texture_det is a detail texture variable.

13. The method as recited in claim 10, wherein the method is carried out with a system comprising:
    (a) a shading module for performing the first shading calculation in order to generate the output;
    (b) a texture look-up module coupled to the shading module for retrieving texture information using texture coordinates associated with the output;
    (c) a feedback loop coupled between an input and an output of the shading module for performing the second shading calculation using the texture information from the texture look-up module in order to generate further output; and
    (d) a combiner module coupled to the output of the shading module for combining the output generated by the shading module.

14. A computer program embodied on a computer readable medium for performing shading calculations in a graphics pipeline, comprising:
    a code segment for performing a first shading calculation in order to generate output during a first pass;
    a code segment for saving the output; and
    a code segment for performing a second shading calculation using the output in order to generate further output during a second pass;
    wherein the first and second shading calculations together include a set of variables including a diffuse color variable, a specular color variable, and an ambient color variable;
    wherein a first subset of the variables is utilized by the first shading calculation during the first pass, and a second subset of the variables is utilized by the second shading calculation during the second pass such that the variables are decoupled at least in part.

15. The computer program as recited in claim 14, wherein:
    (i) the first shading calculation includes $[(1-s)*(Color\_diff+Color\_spec)]$ for generating an output A, and
    (ii) the second shading calculation includes $[Color\_amb+A]$,
    where s is a shadow variable, Color_diff is a diffuse color variable, Color_spec is a specular color variable, and Color_amb is an ambient color variable.

16. The computer program as recited in claim 14, wherein:
(i) the first shading calculation includes [((1−s)*(Color_diff)+Color_amb] for generating an output A, and
(ii) the second shading calculation includes, [A*Texture_det+(1−s)*Color_spec],
where s is a shadow variable, Color_diff is a diffuse color variable, Color_spec is a specular color variable, Color_amb is an ambient color variable, and Texture—det is a texture detail variable.

17. The computer program as recited in claim 14, wherein the code segments are carried out with a system comprising:
(a) a shading module for performing the first shading calculation in order to generate the output;
(b) a texture look-up module coupled to the shading module for retrieving texture information using texture coordinates associated with the output;
(c) a feedback loop coupled between an input and an output of the shading module for performing the second shading calculation using the texture information from the texture look-up module in order to generate further output; and
(d) a combiner module coupled to the output of the shading module for combining the output generated by the shading module.

18. A system for performing shading calculations in a graphics pipeline, comprising:
logic for performing a first shading calculation in order to generate output during a first pass;
logic for saving the output; and
logic for performing a second shading calculation using the output in order to generate further output during a second pass;
wherein the first and second shading calculations together include a set of variables including a diffuse color variable, a specular color variable, and an ambient color variable;
wherein a first subset of the variables is utilized by the first shading calculation during the first pass, and a second subset of the variables is utilized by the second shading calculation during the second pass such that the variables are decoupled at least in part.

* * * * *

UNITED STATES PATENT AND TRADEMARK OFFICE
CERTIFICATE OF CORRECTION

| | |
|---|---|
| PATENT NO. | : 6,593,923 B1 |
| APPLICATION NO. | : 09/640505 |
| DATED | : July 15, 2003 |
| INVENTOR(S) | : Donovan et al. |

It is certified that error appears in the above-identified patent and that said Letters Patent is hereby corrected as shown below:

Col. 1, line 7 replace "PROGRAMMALE" with --PROGRAMMABLE--;

Col. 15, line 10 replace "Texture-det" with --Texture_det--.

Signed and Sealed this

Ninth Day of February, 2010

David J. Kappos
*Director of the United States Patent and Trademark Office*